(12) United States Patent
Choi et al.

(10) Patent No.: US 8,085,228 B2
(45) Date of Patent: Dec. 27, 2011

(54) DISPLAY APPARATUS

(75) Inventors: Hee-Jin Choi, Seoul (KR); Seiki Takahashi, Cheonan-si (KR); Bong-Hyun You, Yongin-si (KR)

(73) Assignee: Samsung Electronics Co., Ltd. (KR)

(*) Notice: Subject to any disclaimer, the term of this patent is extended or adjusted under 35 U.S.C. 154(b) by 453 days.

(21) Appl. No.: 12/411,559

(22) Filed: Mar. 26, 2009

(65) Prior Publication Data
US 2009/0315816 A1  Dec. 24, 2009

(30) Foreign Application Priority Data
Jun. 18, 2008  (KR) .................. 10-2008-0057448

(51) Int. Cl.
*G09G 3/32* (2006.01)
(52) U.S. Cl. ........................................... 345/82; 345/50
(58) Field of Classification Search .............. 345/50–55, 345/80–87, 204
See application file for complete search history.

(56) References Cited

U.S. PATENT DOCUMENTS

| | | | | |
|---|---|---|---|---|
| 5,106,181 A * | 4/1992 | Rockwell, III | ..... | 385/2 |
| 5,207,669 A * | 5/1993 | Baker et al. | ..... | 606/7 |
| 5,337,381 A * | 8/1994 | Biswas et al. | ..... | 385/36 |
| 5,479,543 A * | 12/1995 | Black | ..... | 385/31 |
| 5,631,994 A * | 5/1997 | Appeldorn et al. | ..... | 385/147 |
| 5,754,717 A * | 5/1998 | Esch | ..... | 385/31 |
| 5,857,761 A * | 1/1999 | Abe et al. | ..... | 362/551 |
| 5,987,199 A * | 11/1999 | Zarian et al. | ..... | 385/31 |
| 6,102,917 A * | 8/2000 | Maitland et al. | ..... | 606/108 |
| 6,301,418 B1 * | 10/2001 | Freier et al. | ..... | 385/123 |
| 7,274,847 B2 * | 9/2007 | Gowda et al. | ..... | 385/117 |
| 7,386,203 B2 * | 6/2008 | Maitland et al. | ..... | 385/27 |
| 7,409,122 B2 * | 8/2008 | Kitabayashi et al. | ..... | 385/34 |
| 7,412,141 B2 * | 8/2008 | Gowda et al. | ..... | 385/117 |
| 7,677,780 B2 * | 3/2010 | Lundin et al. | ..... | 362/581 |
| 7,857,457 B2 * | 12/2010 | Rutherford et al. | ..... | 353/31 |

* cited by examiner

*Primary Examiner* — Nitin Patel
(74) *Attorney, Agent, or Firm* — Cantor Colburn LLP

(57) ABSTRACT

A display apparatus includes a display panel, a light generator disposed under the display panel to generate light, a light sensor disposed between the display panel and the light generator and which senses a first portion of the light generated by the light generator and reflected by an object disposed above the display panel, a light diffuser disposed between the display panel and the light sensor, and an image processor which provides image data corresponding to the first portion of the light sensed by the light sensor to the display panel.

19 Claims, 4 Drawing Sheets

DISPLAY APPARATUS

This application claims priority to Korean Patent Application No. 2008-57448, filed on Jun. 18, 2008, and all the benefits accruing therefrom under 35 U.S.C. §119, the contents of which in its entirety are herein incorporated by reference.

BACKGROUND OF THE INVENTION

1. Field of the Invention

The present invention relates to a display apparatus and, more particularly, to a display apparatus having a substantially improved image display quality.

2. Description of the Related Art

Recently, research and development has been conducted to develop a display apparatus which senses a position and/or a shape of an object outside the display apparatus to display an image corresponding to the object on the display device. For instance, some developers have researched a surface computing technology wherein an infrared ray generator and an infrared ray camera are positioned at a rear portion of a display unit, such that the infrared ray camera senses the infrared ray reflected from an object near, e.g., proximate to, the display device, and the infrared ray sensed by the infrared ray camera is used as image data.

Generally, in a display apparatus utilizing the surface computing technology, a projection system is used as the display unit of the display apparatus. However, the projection system is not well suited for the display apparatus employing the surface computing technology, since the projection system has numerous disadvantages, such as a narrow viewing angle and a large size, for example.

Thus, it is desired to develop a display apparatus which overcomes the abovementioned disadvantages.

BRIEF SUMMARY OF THE INVENTION

An exemplary embodiment of the present invention provides a display apparatus having a substantially improved image display quality.

In an exemplary embodiment of the present invention, a display apparatus includes a display panel, a light generator disposed under the display panel and which generates a light, a light sensor disposed between the display panel and the light generator to sense a first portion of the light which is reflected by an object disposed above the display panel, a light diffuser disposed between the display panel and the light sensor, and an image processor which provides image data corresponding to the first portion of the light sensed by the light sensor to the display panel.

The light diffuser diffuses a second portion of the light which is generated by the light generator and reflected from the display panel toward the light sensor. The light sensor senses an amount of the first portion of the light.

The display panel includes an incident face onto which the light generated by the light generator is incident, and an exit face from which the light incident onto the incident face exits. The light diffuser is disposed on the incident face.

In an exemplary embodiment of the present invention, the light diffuser has a haze value from about forty percent to about eighty percent and, more specifically, the light diffuser according to an exemplary embodiment has a haze value about sixty percent.

The light may be an infrared ray.

An alternative exemplary embodiment of the present invention provides a display apparatus which includes a first light generator which generates a first light, a liquid crystal display panel disposed above the first light generator to display an image using the first light, as second light generator disposed under the liquid crystal display panel and which generates a second light, a light sensor disposed between the liquid crystal display panel and the second light generator to sense a first portion of the second light which is reflected from an object disposed above the liquid crystal display panel, and an image processor which provides image data corresponding to the first portion of the second light to the liquid crystal display panel. The liquid crystal display panel includes a first substrate including an incident face onto which the first light generated by the first light generator is incident, a second substrate facing the first substrate and including an exit face from which the light incident onto the incident face exits, a liquid crystal interposed between the first substrate and the second substrate, a first polarizer disposed on the incident face and including a light diffuser disposed thereon, and a second polarizer disposed on the exit face.

The light diffuser diffuses a second portion of the second light generated by the second light generator and reflected by the first polarizer toward the light sensor.

The light sensor senses an amount of the first portion of the second light.

The display apparatus may further include a first optical member disposed between the first light generator and the liquid crystal display panel to diffuse the first light from the first light generator toward the liquid crystal display panel.

The display apparatus may further include a second optical member disposed above the liquid crystal display panel to diffuse the first light exiting the liquid crystal display panel after passing through the liquid crystal display panel.

The light diffuser may have a haze value from about forty percent to about eighty percent. In an exemplary embodiment of the present invention, the light diffuser has a haze value of about sixty percent.

The first polarizer may be an anti-glare polarizer.

The second light may be an infrared ray.

According to exemplary embodiments of the present invention, the light diffuser diffuses the light generated by the light generator and reflected from the display panel. Accordingly, light not required to display an object is diffused by the light diffuser, thereby substantially reducing and/or effectively preventing noise in images displayed on the display apparatus.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
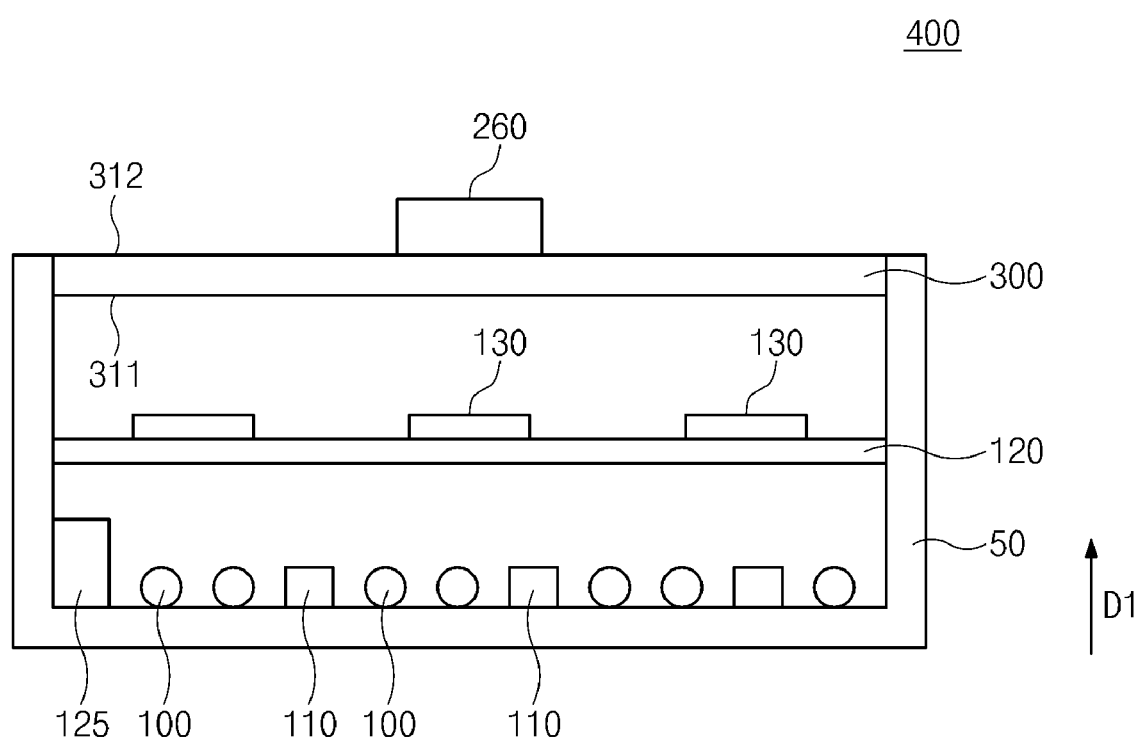
FIG. 1 is a plan view showing an exemplary embodiment of a display apparatus according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

FIG. 1 is a plan view showing an exemplary embodiment of a display apparatus according to the present invention.

Referring to FIG. 1, a display apparatus 400 according to an exemplary embodiment of the present invention includes a plurality of light generators 100, a plurality of infrared ray generators 110, a first optical member 120, a liquid crystal display panel 300, a plurality of infrared ray sensors 130 and an image processor 125. The abovementioned elements of the display apparatus 400 are received in a container 50, as shown in FIG. 1.

Light generators 100 of the plurality of light generators 100 are disposed at a lower, e.g., bottom, portion of the container 50 and generate light. In an exemplary embodiment of the present invention, each of the light generators 100 is a light emitting diode (LED), the light is white light used to display images on the liquid crystal display panel 300. The light advances along a first direction D1 and is thereby provided to the liquid crystal display panel 300 from the light generators 100.

The liquid crystal display panel 300 receives the light generated by the light generators 100 to display the images. Further, the liquid crystal display panel 300 includes an incident face 311, onto which the light from the light generators 100 is incident, and an exit face 312 from which the light exits.

In addition, as will be described in further detail below with reference to FIG. 2, the liquid crystal display panel 300 according to an exemplary embodiment includes two substrates substantially facing each other, liquid crystal interposed between the two substrates, and polarizers disposed on each of the incident face 311 and the exit face 312.

The liquid crystal display panel 300 displays the images corresponding to image data supplied from a data driver (not shown) electrically connected to the liquid crystal display panel 300. More specifically, the liquid crystal display panel 300 may display the images corresponding to information of a position and/or a shape of a subject, e.g., an object, disposed above, e.g., outside and proximate to, the liquid crystal display panel 300. To allow the liquid crystal display panel 300 to display the images corresponding to the information of the position and/or the shape of the object, the display apparatus 400 according to an exemplary embodiment includes infrared ray generators 110 of the plurality of infrared ray generators 110, infrared ray sensors 130 of the plurality of infrared ray sensors 130 and the image processor 125. Each of the infrared ray generators 110 may be an infrared rays light emitting diode (IR LED).

More particularly, the infrared ray generators 110 are disposed at the bottom portion, e.g., the lower portion, of the container 50 and generate the infrared rays. The infrared rays advance substantially along the first direction D1 and arrive at the object 260 after passing through the liquid crystal display panel 300. The infrared rays which arrive at the object 260 are reflected by the object 260. As a result, the advancing direction of the infrared rays is changed, e.g., is substantially reversed, and the infrared rays thereby advance back toward the infrared ray sensors 130.

The infrared ray sensors 130 sense the infrared rays generated by the infrared ray generators 110 and reflected back by the object 260. The infrared ray sensors 130 sense an amount of the infrared rays generated by the infrared ray generators 110 and reflected back by the object 260. However, although an amount of the infrared rays varies due to variations in the position and/or the shape of the object 260, which is reflected by the subject 260, the infrared ray sensors 130 sense the amount of the infrared rays reflected by the subjects 260. Thereafter, the image processor 125 generates the image data corresponding to the infrared rays sensed by the infrared ray sensors 130 and provides the image data to the liquid crystal display panel 300. As a result, the images corresponding to the position and/or the shape of the object 260 are displayed on the liquid crystal display panel 300. Also, since the infrared ray sensors 130 sense the amount of the infrared rays reflected by the object 260 and thereafter applied thereto even though the amount of the infrared rays varies, such as when the object 260 is a moving human finger, for example, the display apparatus 400 senses movement of the human finger based on the infrared ray generators 110 and the infrared ray sensors 130, thereby displaying the images corresponding to the movement of the human finger.

The first optical member 120 diffuses the lights generated by the light generators 100. In an exemplary embodiment of the present invention, the first optical member 120 may have substantially the same function as a light diffusing sheet of a backlight assembly for a liquid crystal display, but alternative exemplary embodiments are not limited thereto. As shown in FIG. 1, the first optical member 120 is disposed between the light generators 100 and the liquid crystal display panel 300, and the light generated by the light generators 100 is therefore uniformly supplied to the liquid crystal display panel 300.

Figure 2:
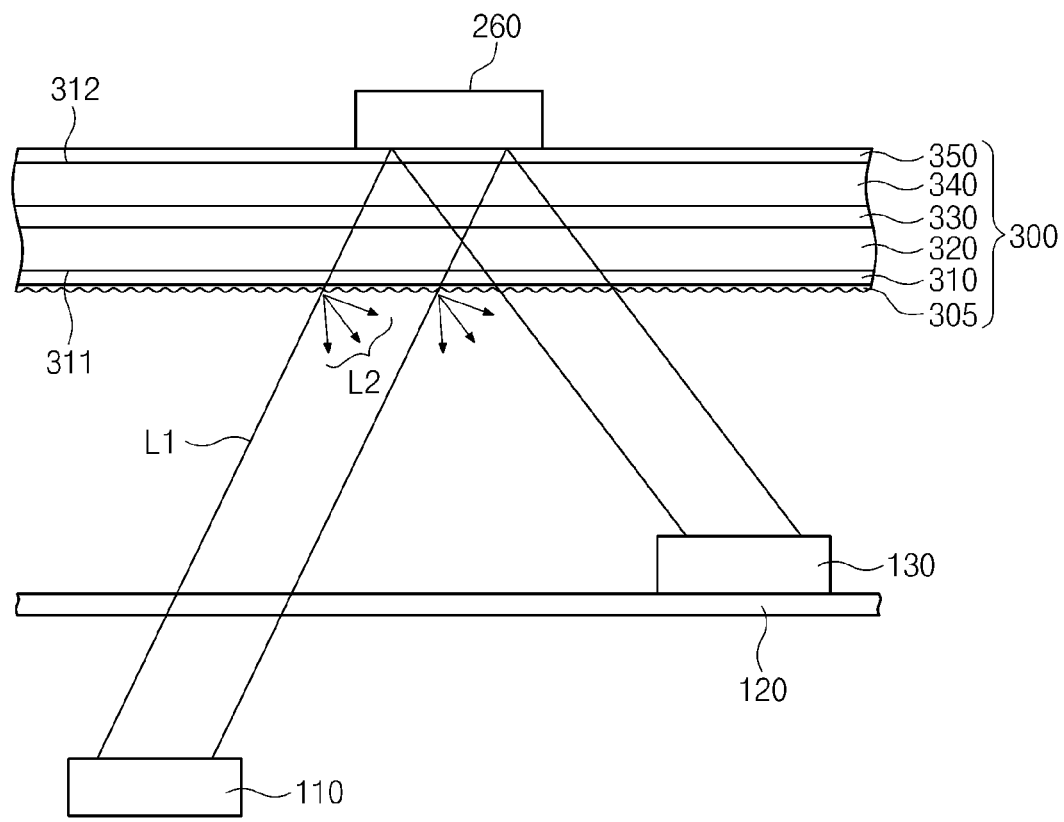
FIG. 2 is a plan view of an exemplary embodiment of a liquid crystal display panel of the display apparatus shown in FIG. 1.

FIG. 2 is a plan view of an exemplary embodiment of a liquid crystal display panel of the display apparatus shown in FIG. 1.

Referring to FIG. 2, the liquid crystal display panel 300 includes a first substrate 320 including the incident face 311, a second substrate 340 substantially facing, e.g., disposed opposite to, the first substrate 320 and having the exit face 312, liquid crystal 330 disposed between the first substrate 320 and the second substrate 340, a first polarizer 310 disposed on the incident face 311, and a second polarizer 350 disposed on the exit face 312.

In an exemplary embodiment, the first substrate 320 may be an array substrate. More particularly, the first substrate 320 according to an exemplary embodiment includes a plurality of pixel areas arranged in a substantially matrix pattern, a plurality of thin film transistors (not shown) disposed in the pixel areas, and a plurality of pixel electrodes (not shown) electrically connected to the thin film transistors.

In an exemplary embodiment of the present invention, the second substrate 340 may be a color filter substrate 340, for example. In addition, the second substrate 340 includes a common electrode (not shown) which forms an electric field together with pixel electrodes of the plurality of pixel electrodes, as well as a plurality of color filters corresponding to the pixel areas. Thus, the liquid crystal display panel 300 controls an arrangement, e.g., and alignment, of liquid crystal molecules in the liquid crystal 330 using the electric field generated by the pixel electrodes and the common electrode. In addition, an amount of the light passing through the liquid crystal display panel 300 is adjusted based on the alignment of the liquid crystal molecules in the liquid crystal 330, and the liquid crystal display panel 300 thereby displays a desired image.

The first polarizer 310 is disposed on the incident face 311 to polarize the light supplied to the first substrate 320 through the incident face 311. The second polarizer 350 is disposed on the exit face 312 to polarize the light exiting to the exterior, e.g., outside the display apparatus 400 to display the desired image, after sequentially passing through the incident face 311 and the exit face 312.

In an exemplary embodiment, the first polarizer 310 is an anti-glare polarizer, but alternative exemplary embodiments are not limited thereto. Thus, the first polarizer 310 is provided with a light diffuser 305 disposed thereon. As a result, the first polarizer 310 diffuses the light passing therethrough and/or diffuses the light reflected therefrom.

The lights diffused by the light diffuser 305 may be the lights generated by the lights generators 100 (refer to FIG. 1) or the infrared rays generated by the infrared ray generators 110.

In operation, a first portion of the infrared rays generated by the infrared ray generators 110 is reflected from the surface of the first polarizer 310, and, more particularly, the first portion of the infrared rays reflected from the surface of the first polarizer 310 is irregularly reflected. Specifically, the first portion of the infrared rays generated by the infrared ray generators 110 and arriving at the light diffuser 305 along a first path L1 are scattered by the light diffuser 305 along various second paths L2.

Thus, without the light diffuser 305, infrared rays reflected from the first polarizer 310 which arrive at the infrared ray sensors 130 are not reflected from the subject 260, and the first portion of infrared rays reflected from the first polarizer 310 and arriving at the infrared ray sensors 130 can not be used to sense information of position and shape of the object 260, thereby causing noise.

However, in an exemplary embodiment of the present invention, when the first portion of the infrared rays reflected from the surface of the first polarizer 310 are scattered by the light diffuser 305, the infrared ray sensors 130 do not sense the first portion of the scattered infrared rays, and the noise is thereby substantially reduced and/or effectively minimized. More particularly, although a substantially portion of the infrared rays generated by the infrared ray generators 110 pass through the liquid crystal display panel 300 and the first portion of the infrared rays is reflected from the first polarizer 310, the noise may occur on the images displayed on the display apparatus 400 in case that the portion of the infrared rays reflected from the first polarizer 310 are concentrated at the infrared ray sensors 130. However, in an exemplary embodiment, the light diffuser 305 is disposed on the surface of the first polarizer 310 and scatters the first portion of the infrared rays reflected from the first polarizer 310, and the infrared rays reflected from the first polarizer 310 may thereby be prevented from being concentrated at the infrared ray sensors 130, thereby substantially reducing and/or effectively eliminating the noise of the image displayed with the display apparatus 400.

Figure 3:
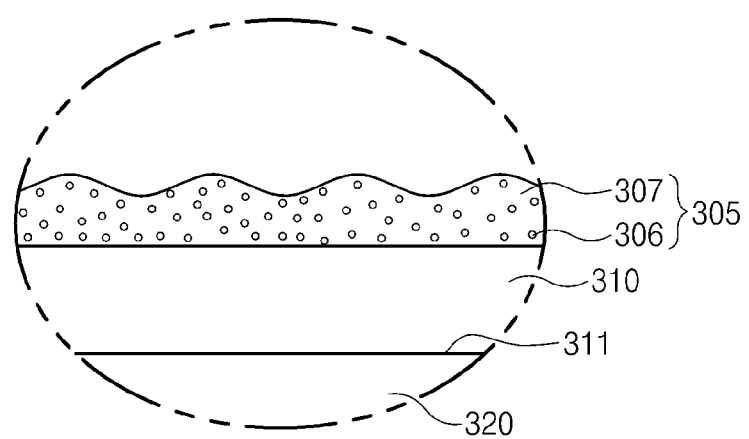
FIG. 3 is a plan view of an exemplary embodiment of a light diffuser of the liquid crystal display shown in FIG. 2.

FIG. 3 is a plan view of an exemplary embodiment of a light diffuser of the liquid crystal display shown in FIG. 2.

Referring to FIG. 3, the light diffuser 305 according to an exemplary embodiment is disposed on the surface of the first polarizer 310 corresponding to the incident face 311 of the first substrate 320. Specifically, the light diffuser 305 according to an exemplary embodiment includes a resin layer 307 and a plurality of beads 306 dispersed in the resin layer 307. Thus, the light passing through the light diffuser 305 is irregularly scattered by beads 306 of the plurality of beads 306.

In an exemplary embodiment, a haze value of the light diffuser 305, defined as a percentage of an amount of light scattered by the light diffuser 305 as compared to an amount of the light passing through the light diffuser 305, has a value from about 40% to about 80%. In an exemplary embodiment, for example, the haze value is about 60%.

The haze value of the light diffuser 305 according to alternative exemplary embodiments may be adjusted based on a number of the beads 306 dispersed in the light diffuser 305. Specifically, as the number of the beads 306 dispersed in the light diffuser 305 increases, the haze value of the light diffuser 305 increases.

Figure 4:
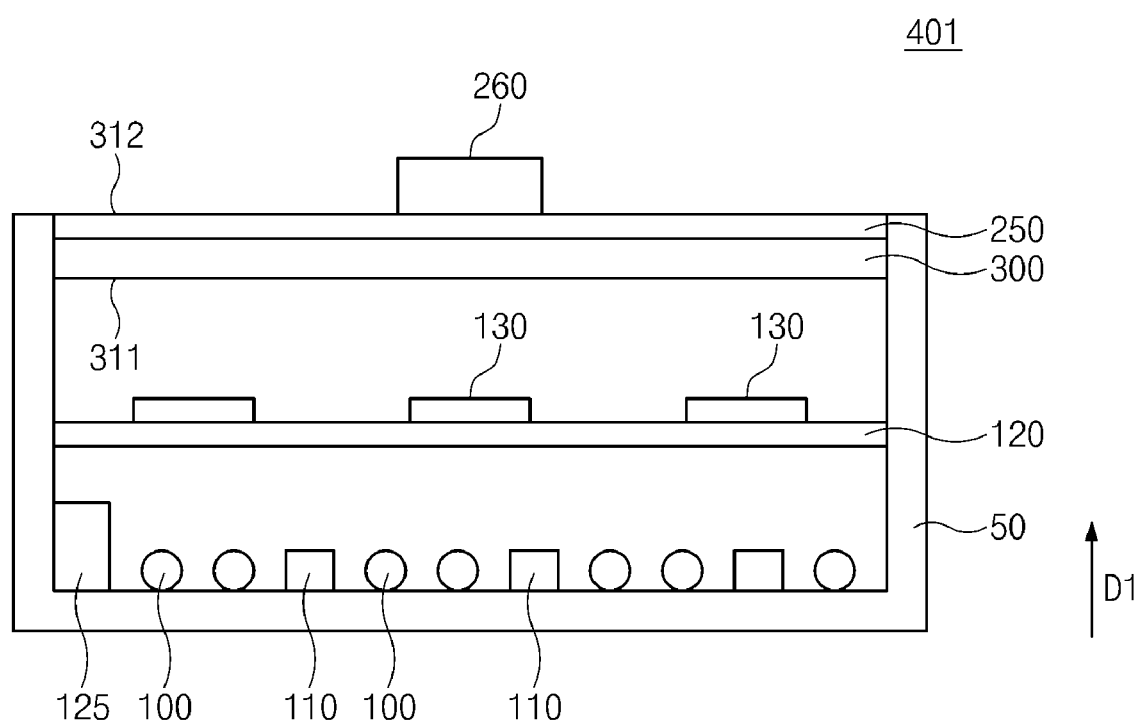
FIG. 4 is a plan view showing an alternative exemplary embodiment of a display apparatus according to the present invention.

FIG. 4 is a plan view showing an alternative exemplary embodiment of a display apparatus according to the present invention. In FIG. 4, the same reference character denote the same or like elements as shown in FIG. 1 and described in greater detail above, and thus any repetitive detailed description thereof will hereinafter be omitted.

Referring to FIG. 4, a display apparatus 401 according to an exemplary embodiment includes a second optical member 250.

The second optical member 250 diffuses the light in a similar manner as with the first optical member 120. Thus, the second optical member 250 diffuses the light generated by the light generators 100 and which passes through the liquid crystal display panel 300. As a result, a user does not visually recognize, e.g., does not perceive or see, the infrared ray sensors 130 disposed in the liquid crystal display panel 300.

However, since the second optical member 250 may scatter the infrared rays generated by the infrared ray generators 110 and, further, since the second optical member 250 is disposed between the subject 260 and the infrared ray sensors 130, the infrared ray sensors 130 senses the object 260 while interposing the second optical member 250 therebetween, thereby causing a deterioration of a contrast ratio of an image displayed on the display apparatus 400. Therefore, in an exemplary embodiment, the second optical member 250 has a haze value which allows the infrared ray sensors 130 in the liquid crystal display panel 300 to not be visually recognized by the user.

Figure 5:
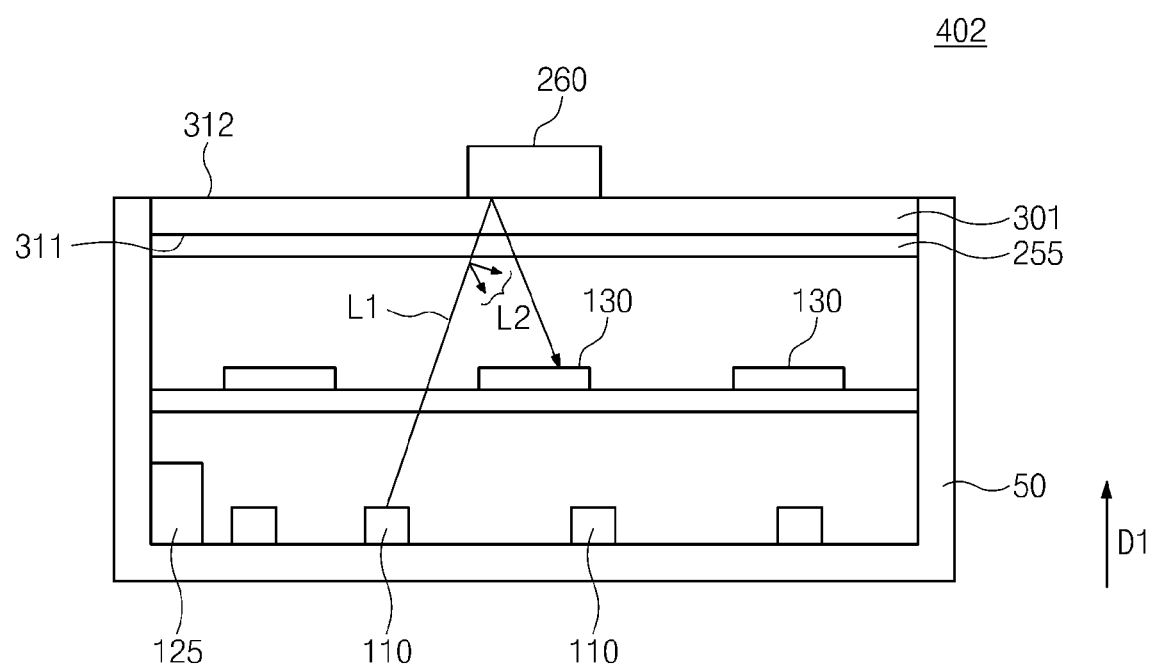
FIG. 5 is a plan view showing another alternative exemplary embodiment of a display apparatus according to the present invention.

FIG. 5 is a plan view showing another alternative exemplary embodiment of a display apparatus according to the present invention. In FIG. 5, the same reference numerals denote the same or like elements as shown in FIGS. 1 and 5 and described in greater detail above, and thus, any repetitive detailed description thereof will hereinafter be omitted.

Referring to FIG. 5, a display apparatus 402 according to an exemplary embodiment includes the infrared ray generators 110, a display panel 301, the infrared ray sensors 130, a light diffuser 255, and the image processor 125. The above-mentioned elements of the display apparatus 402 are accommodated in the container 50, as shown in FIG. 5.

The display panel 301 according to an exemplary embodiment of the present invention displays an image and, moreover, may be a different kind of display panel that the liquid crystal display panel 300 shown in FIG. 1. For example, the display panel 301 according to an alternative exemplary embodiment may be an organic light emitting display panel including an organic light emitting diode or, alternatively, a plasma display panel, for example, but alternative exemplary embodiments of the present invention are not limited thereto.

The light diffuser 255 is disposed between the infrared ray generators 110 and the display panel 301 and is positioned substantially adjacent to the incident face 311 of the display panel 301, as shown in FIG. 5. Thus, the light diffuser 255 diffuses infrared rays generated by the infrared ray generators 110 and thereafter reflected from the display panel 301.

A substantially portion of the infrared rays generated by the infrared ray generators 110 pass sequentially through the incident face 311 and the exit face 312 of the display panel 301, but a first portion of the infrared rays generated by the infrared ray generators 110 are reflected from the incident face 311 back toward the infrared ray sensors 130. When the first portion of the infrared rays generated by the infrared ray generators 110 is reflected from the incident face 311, the first portion of the infrared rays reflected from the incident face 311 are diffused by the light diffuser 255 and thereby advanced toward to the infrared ray sensors 130 in a diffused state.

More particularly, a substantially portion of light generated by the infrared ray generators 110 advance along a first path L1 and exit to an exterior of the display apparatus 402 after passing through the display panel 301, but the first portion of the light, advancing along the second path L2 is reflected from the incident face 311. However, the light diffuser 255 diffuses the first portion of the light reflected from the incident face 311 and which thereafter advance toward the infrared ray sensors 130. Thus, as described in greater detail above with reference to FIG. 2, noise in the image displayed on the display apparatus 402 s substantially reduced and/or effectively minimized in the display apparatus 402 according to an exemplary embodiment of the present invention.

According to exemplary embodiments of the present invention as described herein, a light diffuser diffuses light generated by light generators and reflected from a display panel. Accordingly, lights not necessary to display a position and/or a shape of a subject are diffused by the light diffuser and advanced toward the light sensors, thereby effectively preventing an occurrence of noise in an image displayed on the display apparatus.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A display apparatus comprising:
   a display panel;
   a light generator disposed under the display panel to generate light;
   a light sensor disposed between the display panel and the light generator to sense a first portion of the light which is reflected by an object disposed above the display panel;
   a light diffuser disposed between the display panel and the light sensor; and
   an image processor which provides image data corresponding to the first portion of the light sensed by the light sensor to the display panel.

2. The display apparatus of claim 1, wherein the light diffuser diffuses a second portion of the light which is generated by the light generator and reflected from the display panel toward the light sensor.

3. The display apparatus of claim 2, wherein the light sensor senses an amount of the first portion of the light.

4. The display apparatus of claim 1, wherein the display panel comprises:
an incident face onto which the light generated by the light generator is incident; and
an exit face from which the light incident onto the incident face exits, wherein the light diffuser is disposed on the incident face.

5. The display apparatus of claim 1, wherein the light diffuser has a haze value from about forty percent to about eighty percent.

6. The display apparatus of claim 1, wherein the light diffuser has a haze value about sixty percent.

7. The display apparatus of claim 1, wherein the light comprises an infrared ray.

8. The display apparatus of claim 1, wherein the display panel has a flat shape for flat panel display.

9. A display apparatus comprising:
a first light generator which generates a first light;
a liquid crystal display panel disposed above the first light generator to display an image using the first light;
a second light generator disposed under the liquid crystal display panel and which generates a second light;
a light sensor disposed between the liquid crystal display panel and the second light generator to sense a first portion of the second light which is reflected from an object disposed above the liquid crystal display panel; and
an image processor which provides image data corresponding to the first portion of the second light to the liquid crystal display panel, wherein
the liquid crystal display panel comprises:
a first substrate including an incident face onto which the first light generated by the first light generator is incident;
a second substrate facing the first substrate and including an exit face from which the light incident onto the incident face exits;
a liquid crystal interposed between the first substrate and the second substrate;
a first polarizer disposed on the incident face and including a light diffuser disposed thereon; and
a second polarizer disposed on the exit face.

10. The display apparatus of claim 9, wherein the light diffuser diffuses a second portion of the second light generated by the second light generator and reflected by the first polarizer toward the light sensor.

11. The display apparatus of claim 10, wherein the light sensor senses an amount of the first portion of the second light.

12. The display apparatus of claim 9, further comprising a first optical member disposed between the first light generator and the liquid crystal display panel to diffuse the first light from the first light generator toward the liquid crystal display panel.

13. The display apparatus of claim 9, further comprising a second optical member disposed above the liquid crystal display panel to diffuse the first light exiting the liquid crystal display panel after passing through the liquid crystal display panel.

14. The display apparatus of claim 9, wherein the light diffuser has a haze value from about forty percent to about eighty percent.

15. The display apparatus of claim 9, wherein the light diffuser has a haze value of about sixty percent.

16. The display apparatus of claim 9, wherein the first polarizer comprises an anti-glare polarizer.

17. The display apparatus of claim 9, wherein the second light comprises an infrared ray.

18. The display apparatus of claim 17, wherein the second light generator is infrared rays light emitting diode.

19. The display apparatus of claim 9, wherein the first light generator is a light emitting diode.

* * * * *